United States Patent
Kato et al.

(10) Patent No.: US 6,606,548 B2
(45) Date of Patent: Aug. 12, 2003

(54) HYDRAULIC BRAKE PRESSURE CONTROLLER AND METHOD FOR PRESSURE INCREASE IN A WHEEL BRAKE CYLINDER

(75) Inventors: Toshihisa Kato, Anjou (JP); Kenji Tozu, Yokkaichi (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 84 days.

(21) Appl. No.: 09/799,541

(22) Filed: Mar. 7, 2001

(65) Prior Publication Data

US 2001/0021892 A1 Sep. 13, 2001

(30) Foreign Application Priority Data

Mar. 7, 2000 (JP) .......................... 2000-061967

(51) Int. Cl.[7] .............................. B60T 8/36; B60T 8/60; B60T 8/32
(52) U.S. Cl. ............................. 701/71; 701/70; 303/900
(58) Field of Search ............................ 701/70, 71, 78; 303/155, 116.1, 119.2, 113.2, 116.2, 900, 158, DIG. 2, 163, DIG. 3, DIG. 4

(56) References Cited

U.S. PATENT DOCUMENTS

| | | | | |
|---|---|---|---|---|
| 4,666,218 A | * | 5/1987 | Masaki et al. | 303/106 |
| 5,072,393 A | * | 12/1991 | Mori et al. | 364/426.02 |
| 5,108,161 A | * | 4/1992 | Pichon | 303/115 R |
| 5,295,738 A | * | 3/1994 | Matsuura et al. | 303/100 |
| 5,350,226 A | * | 9/1994 | Burgdorf et al. | 303/116.2 |
| 5,826,952 A | * | 10/1998 | Feigel et al. | 303/119.2 |
| 6,312,064 B1 | * | 11/2001 | Koike et al. | 303/155 |

FOREIGN PATENT DOCUMENTS

JP 9-002233 1/1997

* cited by examiner

Primary Examiner—Tan Q. Nguyen
Assistant Examiner—Dalena Tran
(74) Attorney, Agent, or Firm—Burns, Doane, Swecker & Mathis, LLP (57) ABSTRACT

A hydraulic brake pressure controller and method for pressure increase in a wheel cylinder of a hydraulic brake pressure controller is adapted to obtain favorable ABS control performance in light of the vehicle driving road surface and the stepping force of the brake pedal involves adjusting the pressure increase output time of the pulse pressure increase from a master cylinder to the wheel cylinder based on the pressure differential between the master cylinder hydraulic pressure and the wheel cylinder hydraulic pressure of each wheel cylinder. The wheel cylinder hydraulic pressure of each wheel cylinder is calculated based on an estimated vehicle deceleration obtained from an estimated vehicle speed.

16 Claims, 6 Drawing Sheets

HYDRAULIC BRAKE PRESSURE CONTROLLER AND METHOD FOR PRESSURE INCREASE IN A WHEEL BRAKE CYLINDER

This application is based on and claims priority under 35 U.S.C. §119 with respect to Japanese Application No. 2000-061967 filed on Mar. 7, 2000, the entire content of which is incorporated herein by reference.

FIELD OF THE INVENTION

The present invention generally relates to vehicle brake systems. More particularly, the present invention pertains to a vehicle hydraulic brake pressure controller and a method for increasing hydraulic pressure in wheel brake cylinders of a vehicle hydraulic brake pressure controller.

BACKGROUND OF THE INVENTION

Known vehicle hydraulic brake pressure controllers provided with an anti-lock braking system (ABS controller) control the braking force to maximize the friction coefficient between the road surface and wheels by decreasing, increasing, and holding the brake pressure in the wheel brake cylinder of each wheel to avoid lock up of the wheels upon sudden braking (when the brake pedal is suddenly applied). In these known anti-lock braking systems, the lock-up condition of the wheels is detected by assessing whether the wheel acceleration or wheel deceleration is greater than a predetermined threshold value or whether a slip ratio obtained based on the wheel speed and the vehicle speed is greater than a predetermined threshold value. This assessment is then used to start the anti-lock braking system control.

Typically, when the brake hydraulic pressure (Pwc) for each wheel cylinder is increased under anti-lock braking control, a pulse pressure increase time t0 is adjusted by the amount of the master cylinder hydraulic pressure (Pmc) actuated by applying the brake pedal. In other words, in the known anti-lock braking system, a stable ABS control performance is ensured by providing a pressure increase amount in accordance with the change of the stepping force of the brake pedal by adjusting the pulse pressure increase time t0 depending on the amount of the master cylinder hydraulic pressure (Pmc).

However, the known method for effecting pressure increase includes at least the following disadvantages. The master cylinder hydraulic pressure (Pmc) is proportional to the brake pedal stepping force. The brake hydraulic pressure (Pwc) for the wheel cylinder of each wheel varies depending on the friction force (that is the friction coefficient $\mu$ of the road surface) affecting each wheel. The friction force (the friction coefficient $\mu$ of road surface) is directly proportional to the brake hydraulic pressure (Pwc) for the wheel cylinder of each wheel.

The pressure increase speed (pressure increase gradient) of the brake hydraulic pressure in the wheel cylinder is determined based on the pressure differential between the master cylinder hydraulic pressure (Pmc) generated in the master cylinder and the brake hydraulic pressure (Pwc) delivered to the wheel cylinder of each wheel (Pmc-Pwc= $\Delta$P). Accordingly, the pressure differential (Pmc-Pwc=$\Delta$P) varies depending on the friction force (the friction coefficient $\mu$ of the road surface) affecting each wheel to change the pressure increase gradient. The pressure increase gradient is reduced at high friction coefficient $\mu$ of road surface due to high Pwc pressure and is increased at low friction coefficient $\mu$ of road surface due to low Pwc pressure.

As a result, when the pulse pressure increase is conducted with the pulse pressure increase time based on the master cylinder hydraulic pressure, the increase amount ($\Delta$P·t0) may be excessively small in connection with the road surfaces having a high friction coefficient $\mu$ and may be too large in connection with road surfaces having a low friction coefficient $\mu$.

These drawbacks make it difficult to obtain ABS control performance that is suitable for the stepping force applied to the brake pedal.

A need thus exists for an improved hydraulic brake pressure controller that obviates drawbacks associated with known hydraulic brake pressure controllers such as those described above.

A need also exists for a hydraulic brake pressure controller and method for increasing the pressure in the wheel cylinders of a hydraulic brake pressure controller that are capable of obtaining ABS control performance suitable for the condition of a driving road surface and the stepping force of the brake pedal.

SUMMARY OF THE INVENTION

One aspect of the invention involves a method for pressure increase in a wheel cylinder of a hydraulic brake pressure controller for providing a braking force to a wheel by supplying brake pressure from a hydraulic pressure generator to the wheel cylinder. The method for pressure increase in the hydraulic brake pressure controller is conducted based on the pressure differential between the hydraulic pressure of brake fluid supplied from the hydraulic pressure generator and the brake hydraulic pressure in the wheel cylinder when the brake pressure in the wheel cylinder is increased by the hydraulic pressure controller.

Compared to known systems that control the pressure increase based on only the hydraulic pressure of the brake fluid supplied from the hydraulic pressure generator, the present invention inhibits or prevents an insufficiency in the amount of the increase of the brake hydraulic pressure to the wheel cylinder under a high $\mu$ road surface condition while also inhibiting or preventing an excessive increase in the amount of the brake hydraulic pressure in the wheel cylinder at low $\mu$ road surface condition when pressurizing each wheel cylinder by the hydraulic pressure controller. As a result, ABS control performance suitable for the vehicle driving road surface and the stepping force on he brake pedal can be obtained.

According to another aspect of the invention, a method for pressure increase in wheel cylinders of a hydraulic brake pressure controller to provide a braking force to vehicle wheel by supplying brake pressure from a hydraulic pressure generator to the wheel cylinders includes determining the hydraulic brake pressure in the wheel cylinders, determining the brake pressure supplied from the hydraulic pressure generator, performing anti-lock braking control by selecting one of a pressure decreasing mode, pulse pressure increasing mode and a pressure maintaining mode, determining the pressure differential between the brake pressure supplied from the hydraulic pressure generator and the hydraulic brake pressure in the wheel cylinders, and increasing the hydraulic brake pressure in the wheel cylinders based on the determined pressure differential when the pulse pressure increasing mode is selected.

Another aspect of the invention involves a hydraulic brake pressure controller that includes a plurality of wheel cylinders each operatively associated with a respective vehicle wheel for providing a braking force to the vehicle wheel, a hydraulic pressure generator for supplying brake hydraulic pressure to the wheel cylinders, a hydraulic pressure detector for detecting hydraulic pressure supplied by the hydraulic pressure generator, a hydraulic pressure controller provided between the hydraulic pressure generator and the wheel cylinders for controlling brake hydraulic pressure in the wheel cylinders, a wheel speed detector for detecting a wheel speed of each wheel, and a wheel speed calculator for calculating the wheel speed using an output signal from the wheel speed detector. A wheel acceleration calculator calculates a wheel acceleration of each wheel using the wheel speed, an estimated vehicle deceleration calculator calculates vehicle deceleration using an output signal from the hydraulic pressure detector, and an estimated vehicle speed calculator calculates an estimated vehicle speed based on the wheel speed and the vehicle deceleration. A braking force controller controls the braking force applied to the wheels by actuating the hydraulic pressure controller in accordance with the calculated wheel speed, the calculated wheel acceleration, and the calculated estimated vehicle speed. Anti-lock braking control is actuated by the braking force controller to select any one of a pressure decrease mode, a pulse pressure increase mode, and a pressure maintaining mode by judging whether a wheel acceleration is greater than a predetermined threshold value and whether a slip ratio obtained based on the wheel speed and the estimated vehicle speed is greater than a predetermined threshold value by the braking force controller. A pulse pressure increase time of the brake hydraulic pressure used during the pulse pressure increase mode is adjusted based on a pressure differential between the pressure supplied by the hydraulic pressure generator and the brake hydraulic pressure in the wheel cylinders.

The anti-lock braking control is conducted by directing a pressure decrease mode, a pulse pressure increase mode, or a maintenance mode after judging whether the wheel acceleration is greater than a predetermined threshold value and a slip ratio obtained based on the wheel speed and the estimated vehicle speed is greater than a predetermined threshold value by the braking force controller. A pulse pressure increase time of the brake hydraulic pressure in the wheel cylinder is adjusted based on the pressure differential between the generated hydraulic pressure of the hydraulic pressure generator and the brake hydraulic pressure in the wheel cylinder.

The product of the increase amount of the brake hydraulic pressure in the wheel cylinder (i.e., the pressure differential between the generated hydraulic pressure of the hydraulic pressure generator and the brake hydraulic pressure in the wheel cylinder) and the pulse pressure increase time can be suitably adjusted for the vehicle driving road surface and the stepping force of the brake pedal. Consequently, an insufficiency in the amount of increase of brake hydraulic pressure in the wheel cylinder at high $\mu$ road surface condition and an excess in the amount of increase of the brake hydraulic pressure in the wheel cylinder at low $\mu$ road surface condition can be prevented to obtain a highly desirable and substantially optimum ABS control performance for the vehicle driving road surface and the stepping force of the brake pedal.

In the hydraulic brake pressure controller of the present invention, the brake hydraulic pressure in the wheel cylinder is calculated based on the estimated vehicle deceleration obtained from the estimated vehicle speed. Because the brake hydraulic pressure in the wheel cylinder is calculated based on the estimated vehicle deceleration obtained from the estimated vehicle speed, it is not necessary to provide detecting means for directly detecting the brake hydraulic pressure in the wheel cylinder such as a detecting sensor. This advantageously reduces the manufacturing cost of the hydraulic brake pressure controller.

In addition, in the hydraulic brake pressure controller of the present invention, a first estimated vehicle speed is calculated based on the wheel speed, and a second estimated vehicle speed is determined by subtracting a product of the estimated vehicle deceleration and a time associated with one cycle of the program or routine from the calculated value of the estimated vehicle speed of last transaction cycle. When the first estimated vehicle speed is greater than the second estimated vehicle speed, the first estimated vehicle speed is determined as the estimated vehicle speed. When the first estimated vehicle speed is equal to or less than the second estimated vehicle speed, the second estimated vehicle speed is determined as the estimated vehicle speed. Thus, the underestimation of the estimated vehicle speed due to the interference of each of the wheels of the 4WD vehicle can be avoided. The underestimation of the slip ratio estimated from the estimated vehicle speed and the wheel speed can also be avoided. Also, the delay in starting anti-lock braking control due to the misjudgment that the vehicle speed and the wheel speed are different as judged from the decline of the estimated vehicle speed accompanied by the simultaneous decline of the wheel speed of the four wheels can be inhibited or prevented.

According to a further aspect of the invention, a hydraulic brake pressure controller includes a plurality of wheel cylinders each operatively associated with a respective vehicle wheel for providing a braking force to the vehicle wheel, a hydraulic pressure generator for supplying brake hydraulic pressure to the wheel cylinders, a hydraulic pressure detector for detecting hydraulic pressure supplied by the hydraulic pressure generator, a hydraulic pressure controller provided between the hydraulic pressure generator and the wheel cylinders for controlling brake hydraulic pressure in the wheel cylinders, a braking force controller for controlling a braking force applied to the wheels to perform anti-lock braking under any one of a pressure decrease mode, a pulse pressure increase mode, and a pressure maintaining mode, and a device for determining a pulse pressure increase time for carrying out the pulse pressure increase mode based on a pressure differential between the hydraulic pressure supplied by the hydraulic pressure generator and the hydraulic brake pressure in the wheel cylinders.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
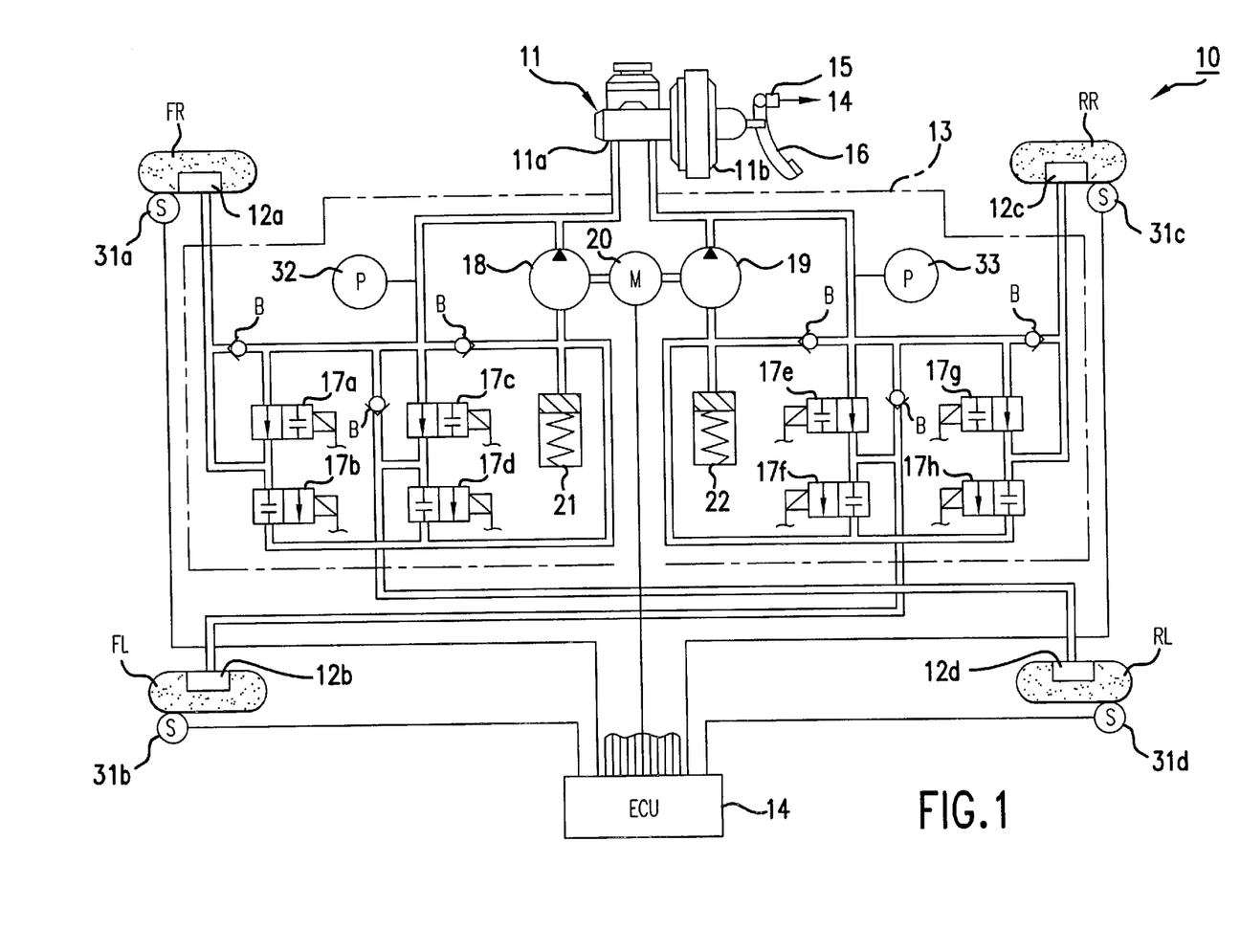
FIG. 1 is a schematic view of a hydraulic brake pressure controller according to the present invention.

Referring initially to FIG. 1, which illustrates a hydraulic circuit of the hydraulic brake pressure controller of the present invention, the hydraulic brake pressure controller 10 is comprised of a hydraulic pressure generator 11 that includes a master cylinder 11a and a booster 11b, wheel cylinders 12a–12d each provided on a respective one of the vehicle wheels (i.e., a front right wheel FR, a front left wheel FL, a rear right wheel RR, and a rear left wheel RL), an actuator 13 functioning as a hydraulic pressure controller and located between the hydraulic pressure generator 11 and the wheel cylinders 12a–12d via first and second hydraulic pressure conduits (conduit means), and an electronic control unit 14 operating as a braking force controller (controlling means) for controlling the actuator 13.

The hydraulic pressure generator 11 is actuated by operation of a brake pedal 16 provided with a brake switch 15. The hydraulic pressure generator 11 generates line pressure in the first and second hydraulic pressure conduits when the brake pedal 16 is actuated.

As shown in FIG. 1, the actuator 13 includes four solenoid valves 17a–17d provided in the first hydraulic pressure conduit means connecting a first output port of the master cylinder 11a with the wheel cylinders 12a, 12d, and a first pump 18 provided between the solenoid valves 17a–17d and the master cylinder 11a. The actuator also includes four additional solenoid valves 17e–17h provided in the second hydraulic pressure conduit means connecting a second output port of the master cylinder with the wheel cylinders 12b, 12c, and a second pump 19 positioned between the solenoid valves 17e–17h and the master cylinder 11a. The first pump 18 and the second pump 19 are actuated by a common electric motor 20 to supply the first and the second hydraulic pressure conduit means with the brake fluid pressure pressurized at a predetermined pressure.

The solenoid valves 17a, 17c in this embodiment are normally open type solenoid valves. The discharge sides of the solenoid valves 17a, 17c in the first hydraulic pressure conduit are respectively connected to the wheel cylinder 12a for front right wheel and the wheel cylinder 12d for rear left wheel. The solenoid valves 17e, 17g are normally open type solenoid valves. The discharge sides of the solenoid valves 17e, 17g in the second hydraulic pressure conduit are respectively connected to the wheel cylinder 12b for front left wheel and the wheel cylinder 12c for rear right wheel.

The solenoid valves 17b, 17d are normally closed type solenoid valves. The discharge sides of the solenoid valves 17b, 17d are connected to the inlet of the first pump 18 via a first reservoir 21. The solenoid valves 17f, 17h are normally closed type solenoid valves. The discharge sides of the solenoid valves 17f, 17h are connected to the inlet of the second pump 19 via a second reservoir 22. The first and the second reservoirs 21, 22 are each provided with a piston and a spring, and are adapted to reserve or store brake fluid circulated from the solenoid valves 17b, 17d, 17f, 17h via the first and the second hydraulic pressure conduits on the discharge side and supply the brake fluid to the first and the second pumps 18, 19 when the pumps are operated.

The solenoid valves 17a–17h are two-port, two-position type solenoid valves. When the solenoid valves 17a–17h are de-energized or in the OFF condition, communication between the respective wheel cylinders 12a–12d and the hydraulic pressure generator 11 is established by the solenoid valves 17a–17h.

When the solenoid valves 17a–17h are energized or in the ON condition, the solenoid valves 17a–17h block communication between the respective wheel cylinders 12a–12d and the hydraulic pressure generator 11, and establish communication between the wheel cylinder 12a–12d and the respective first and the second reservoirs 21, 22. As shown in FIG. 1, a plurality of one-way check valves B are provided in the first and the second hydraulic pressure conduits. The check valves B allow the flow of the brake fluid only in the direction from the wheel cylinders 12a–12d and the first and the second reservoirs 21, 22 to the hydraulic pressure generator 11.

The brake hydraulic pressure of the wheel cylinders 12a–12d is controlled to be increased, maintained, and decreased by switching the solenoid valves 17a–17h ON-OFF under the control of the electronic control unit 14. When the solenoid valves 17a–17h are de-energized, the brake fluid pressure is supplied from the hydraulic pressure generator 11 and the first and the second pumps 18, 19 to the wheel cylinders 12a–12d to increase the wheel cylinder pressure. On the other hand, when the solenoid valves 17a–17h are energized, communication is established between the wheel cylinders 12a–12d and the first and the second reservoirs 21, 22 to decrease the pressure in the wheel cylinders. Also, when the solenoid valves 17a, 17c, 17e, 17g are energized and the solenoid valves 17b, 17d, 17f, 17h are de-energized simultaneously, the brake hydraulic pressure level in the wheel cylinders is maintained. Further, by adjusting or controlling the time for energizing each solenoid valve 17a–17h under the control of the electronic control unit 14, a pulse pressure increase involving a combination of the increase and holding of the pressure and a pulse pressure decrease involving a combination of the decrease and holding of the pressure can be achieved to slowly increase or decrease the brake hydraulic pressure.

Figure 2:
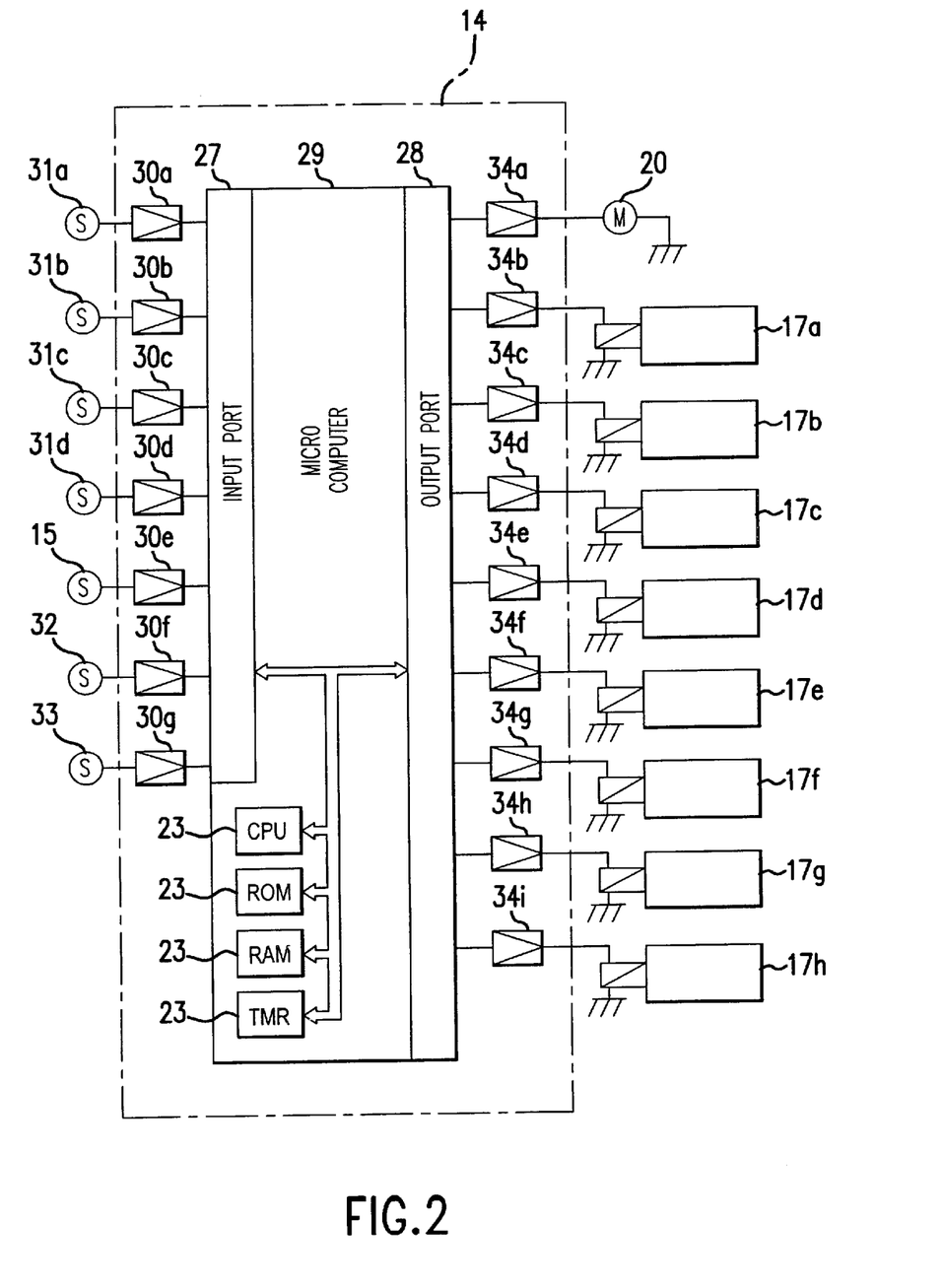
FIG. 2 is a schematic illustration of the electronic control unit used in the hydraulic brake pressure controller of FIG. 1.

As shown in FIG. 2, the electronic control unit 14 is comprised of a micro computer 29 that includes a CPU 23, a ROM 24, a RAM 25, a timer (TMR) 26, an input port 27, and an output port 28 interconnected via bus lines. The input port 27 is connected to wheel speed sensors 31a–31d operating as wheel speed detecting means provided on each wheel FR, FL, RR, RL via amplification circuits 30a–30g. The input port 27 is also connected to hydraulic pressure detectors 32, 33 operating as hydraulic pressure detecting means provided in the first and the second hydraulic pressure conduit means on the side of the brake switch 15 and the master cylinder 11a shown in FIG. 1.

The output port 28 is connected to the electric motor 20 via an actuating circuit 34a and is also connected to the solenoid valves 17a–17h via respective actuating circuits 34b–34i. The ROM 24 stores a program for an anti-lock braking system (hereinafter called ABS). The CPU 23 carries out the program when an ignition switch (not shown) is turned on. The RAM 25 tentatively stores variable data necessary for carrying out the program. In this embodiment of the present invention, the electronic control unit 14 controls the electric motor 20 and the solenoid valves 17a–17h based on the output signal from the wheel speed sensors 31a–31d, the brake switch 15, and the hydraulic pressure detectors 32, 33.

Figure 3:
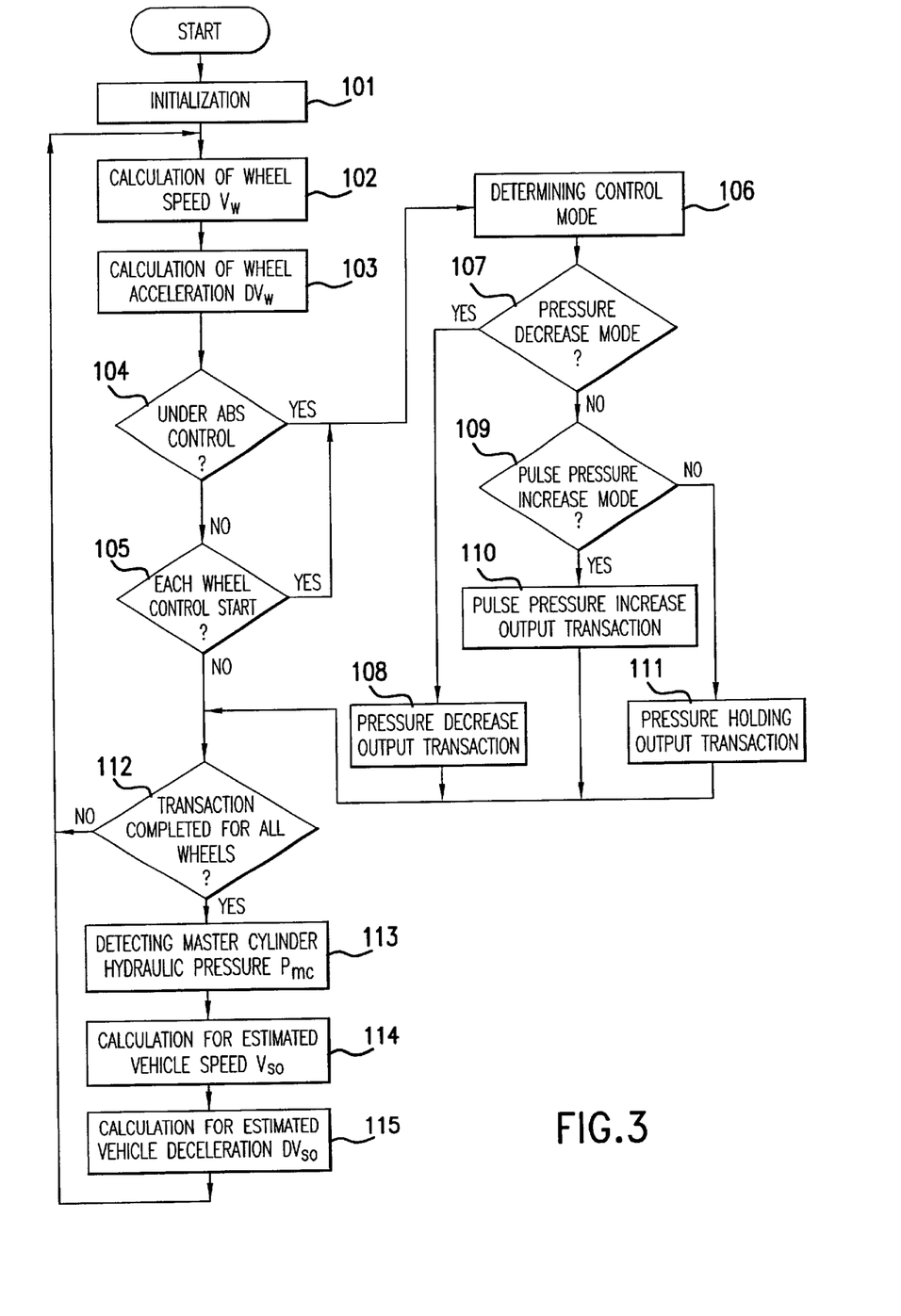
FIG. 3 is a flowchart of the overall operation of the anti-lock braking control system.

When the vehicle engine is turned on, that is when the ignition switch is turned on, the program shown in FIG. 3 is repetitively carried out by the CPU 23 of the electronic control unit 14 in the following manner until the engine is terminated, that is until the ignition switch is turned off. As shown in FIG. 3, the program starts when the ignition switch is turned on. In Step 101, the micro computer 29 is initialized by initializing each calculation value, an estimated vehicle speed Vso which becomes a standardized vehicle speed for control, a wheel speed Vw, and a wheel acceleration DVw.

In Step 102, the wheel speed Vw of each wheel FR, FL, RR, RL is calculated based on the output signal from the wheel speed sensors 31a–31d, and the calculated value is memorized or stored in the RAM 25. Next, in Step 103, the wheel acceleration DVw of each wheel FR, FL, RR, RL is calculated based on the calculated value of the wheel speed Vw of each wheel FR, FL, RR, RL calculated in Step 102. This calculated wheel acceleration DVw is memorized or stored in the RAM 25.

In Step 104, the system judges or determines whether ABS control is under operation (i.e., whether the vehicle is operating under ABS control). When it is determined in Step 104 that ABS control is under operation, the program proceeds to Step 106. When it is determined in Step 104 that ABS is not under operation (i.e., prior to operation of ABS), the program proceeds to Step 105. In Step 105, the system determines or judges whether the ABS control is to be started, that is whether the condition for starting ABS control is satisfied, for each wheel FR, FL, RR, RL. When the condition for starting ABS control is satisfied (i.e., when ABS control is to be started for each wheel FR, FL, RR, RL), the program proceeds to Step 106. When the condition for starting ABS control is not satisfied, the program proceeds to Step 112. Because the conditions for Step 104 and Step 105 are not satisfied when the brake pedal is not applied during normal driving or at the initial stage of starting the vehicle, the program proceeds to Step 112 after processing Step 104 and Step 105.

In Step 112, it is judged or determined whether the identical program or transaction has been completed for each of the four wheels. The transaction mentioned here refers to the algorithmic transaction (i.e., calculation or determination) of the wheel speed Vw and the wheel acceleration DVw for each wheel. When the transaction or routine for all four wheels has not been completed, the program returns to Step 102 to repeat the same program or transaction for the wheel(s) in which the program or transaction has not been completed. When it is determined in Step 112 that the program or transaction for all four wheels is completed, the program proceeds to Step 113 to detect the hydraulic pressure Pmc generated by the master cylinder 11a (hereinafter called master cylinder hydraulic pressure). This master cylinder hydraulic pressure Pmc is detected by the hydraulic pressure detectors 32, 33.

In Step 114, the estimated vehicle speed Vso which is to be a standard condition for starting the ABS control is calculated in the manner described below. In Step 115, an estimated vehicle deceleration DVso is calculated by differentiating the estimated vehicle speed Vso determined in Step 114. After completing Step 115, one cycle of the program is completed, and the routine returns to Step 102 for starting another program cycle.

When the brake pedal is applied during normal driving and it is judged in Step 105, based on the last estimated vehicle speed Vso calculated in Step 114 of the program routine, that the condition for starting the ABS control is satisfied, the program proceeds to Step 106. In Step 106, a control mode for the wheel cylinder 12a–12d associated with each respective wheel is selected by judging whether the wheel acceleration DVw is greater than a predetermined threshold value and whether a slip ratio obtained based on the wheel speed Vw and the estimated vehicle speed Vso is greater than a predetermined threshold value. The control mode is selected by judging the foregoing, and such selection is made in each respective wheel FL, FR, RL, RR on the basis of the values of each wheel acceleration DVw and each wheel speed Vw of the respective wheels FL, FR, RL, RR. The appropriate control is then conducted to decrease the pressure, increase the pressure, or hold the pressure conveyed to the wheels cylinders 12a–12d of each wheel FL, FR, RL, RR in a manner explained hereinafter based on the control mode for each wheel FL, FR, RL, RR. For instance, when the pressure decrease mode is selected as the control mode for the front right wheel FR based on the wheel speed Vw and the wheel acceleration DVw of the front right wheel FR, the pressure in the wheel cylinder 12a of the front right wheel FR is decreased. Likewise, when the pulse pressure increase mode is selected as the control mode for the rear right wheel RR based on the wheel acceleration DVw and the wheel speed Vw of the rear right wheel RR, the pressure in the wheel cylinder 12c of the rear right wheel RR in increased.

Next, in Step 107, it is determined whether the control mode selected in Step 106 is the pressure decrease mode. When it is determined in Step 107 that the pressure decrease control mode has been selected in Step 106, a pressure decrease output is conducted in Step 108.

When it is determined in Step 107 that the pressure decrease mode has not been selected, a determination is made in Step 109 whether the pulse pressure increase mode has been selected. When it is determined in Step 109 that the pulse pressure increase mode has been selected, a pulse pressure increase output is conducted in Step 110 according to a pressure increase time adjusted by a method described hereinafter. When it is determined in Step 109 that the pulse pressure increase mode has not been selected, a pulse maintaining or holding output is conducted in Step 111. The routine proceeds to Step 112 after completing the operation in Step 108 or Step 110 or Step 111.

In Step 112 a determination is made regarding whether the transaction or program for all four wheels FL, FR, RL, RR is completed. In this case, the transaction or program corresponds to the transaction involving the pressure decrease, pressure increase or pressure holding for the four wheels FL, FR, RL, RR. After Step 112, the program proceeds in the manner described above.

Figure 4:
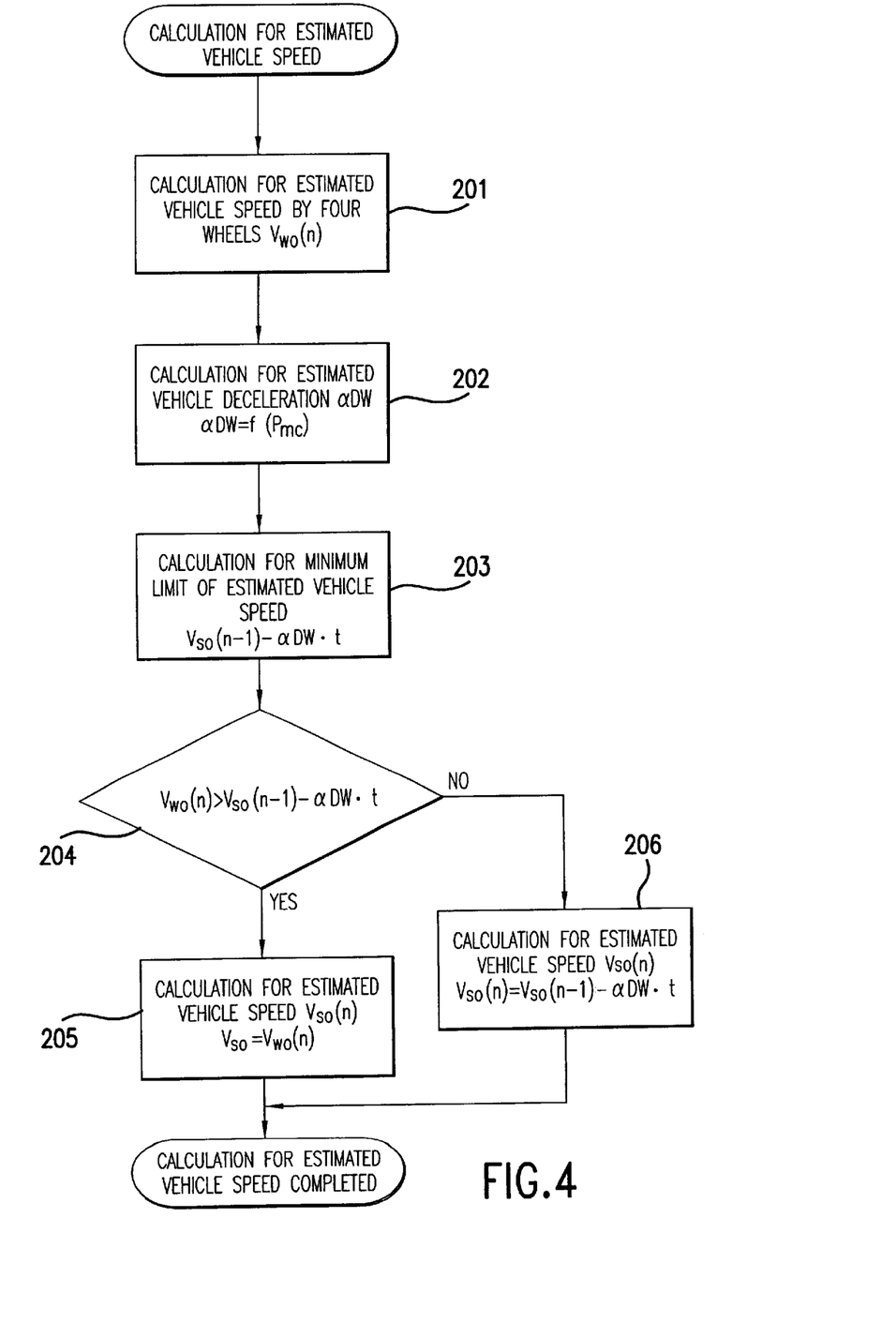
FIG. 4 is a flowchart of the routine used to calculate the estimated vehicle speed $\alpha$DW shown in FIG. 3.

The estimated vehicle speed Vso determined in Step 114 is obtained following the method or routine shown in FIG. 4. In Step 201, the fastest wheel speed amongst the wheel speeds of the four wheels FL, FR, RL, RR is obtained for each program cycle (one cycle for the program corresponds to 6 ms). The fastest wheel speed is determined as an estimated vehicle speed $Vwo_{(n)}$ of the four wheels, that is a first estimated vehicle speed. In the case of the routine shown in FIG. 4, (n) and (n−1) indicate that the program is the (n)th or the (n−1)th cycle, where (n) is a natural number.

In Step 202, an estimated vehicle deceleration αDw is calculated based on the master cylinder hydraulic pressure Pmc detected in Step 113.

Figure 5:
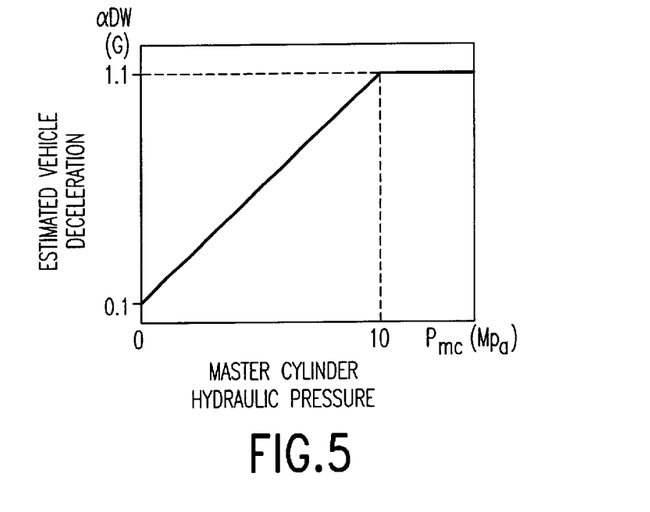
FIG. 5 is a graph showing the relationship between the master cylinder hydraulic pressure Pmc and the estimated vehicle speed αDW used for calculating the estimated vehicle speed αDW shown in FIG. 4.

As shown in FIG. 5, the estimated vehicle deceleration αDw is set forth in a map identifying the estimated vehicle deceleration αDw relative to the master cylinder hydraulic pressure Pmc. That is, the estimated vehicle deceleration αDw is a function of the master cylinder pressure Pmc. In this embodiment of the present invention, the following relationships exist between the estimated vehicle deceleration αDw and the master cylinder hydraulic pressure Pmc.

1. The estimated vehicle deceleration αDw corresponds to 0.1 (αDw=0.1) when the mater cylinder hydraulic pressure Pmc is equal to zero (Pmc=0).

2. When the master cylinder hydraulic pressure Pmc is greater than zero and less than 10 Mpa (0<Pmc<10 (Mpa)), the master cylinder hydraulic pressure Pmc and the estimated vehicle deceleration αDw are directly proportional to each other.

3. When the master cylinder hydraulic pressure Pmc is equal to or greater than 10 Mpa (Pmc≧10 (Mpa)), the estimated vehicle deceleration αDw is equal to 1.1 (αDw=1.1), which is constant.

In Step 203, a minimum limit value of the estimated vehicle speed, that is a second estimated vehicle speed, is calculated. The minimum limit of the estimated vehicle speed is calculated by subtracting the product of the estimated vehicle deceleration αDw and the time for one program cycle from the estimated vehicle speed $Vso_{(n-1)}$ determined in the last program cycle $Vso_{(n-1)}-\alpha Dw \cdot t$.

In Step 204, the first estimated vehicle speed $Vwo_{(n)}$ obtained in Step 201 and the minimum limit value of the estimated vehicle speed (second estimated vehicle speed) $Vso_{(n-1)}-\alpha Dw \cdot t$ obtained in Step 203 are compared. When the first estimated vehicle speed $Vwo_{(n)}$ is greater than the second estimated vehicle speed $Vso_{(n-1)}-\alpha Dw \cdot t$, the program proceeds to Step 205 where it is determined that the first estimated vehicle speed $Vwo_{(n)}$ is the estimated vehicle speed Vso of this program cycle. Accordingly, it is determined that $Vso=Vwo_{(n)}$. On the other hand, when it is determined in Step 204 that the first estimated vehicle speed $Vwo_{(n)}$ is equal to or less than the second estimated vehicle speed $Vso_{(n-1)}-\alpha Dw \cdot t$, the program proceeds to Step 206. Here it is determined that the second estimated vehicle speed $Vso_{(n-1)}-\alpha Dw \cdot t$ is the estimated vehicle speed Vso of this program cycle. Accordingly, it is determined that $Vso=Vso_{(n-1)}-\alpha Dw \cdot t$.

Figure 6:
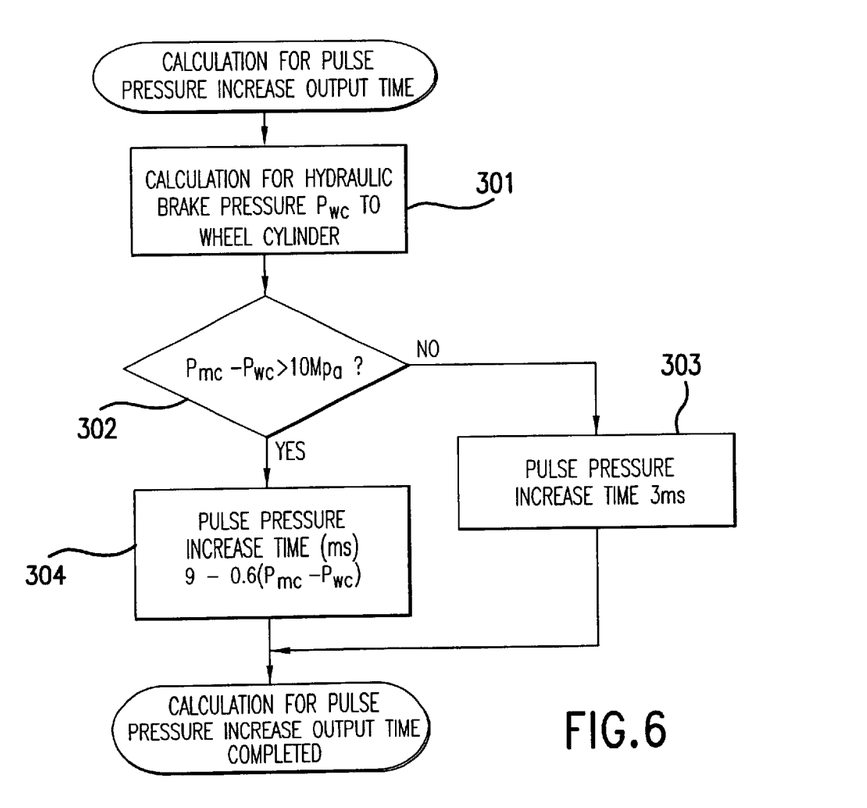
FIG. 6 is a flowchart carried out to calculate the pulse pressure increase output time of the pulse pressure increase shown in FIG. 3.
Figure 7:
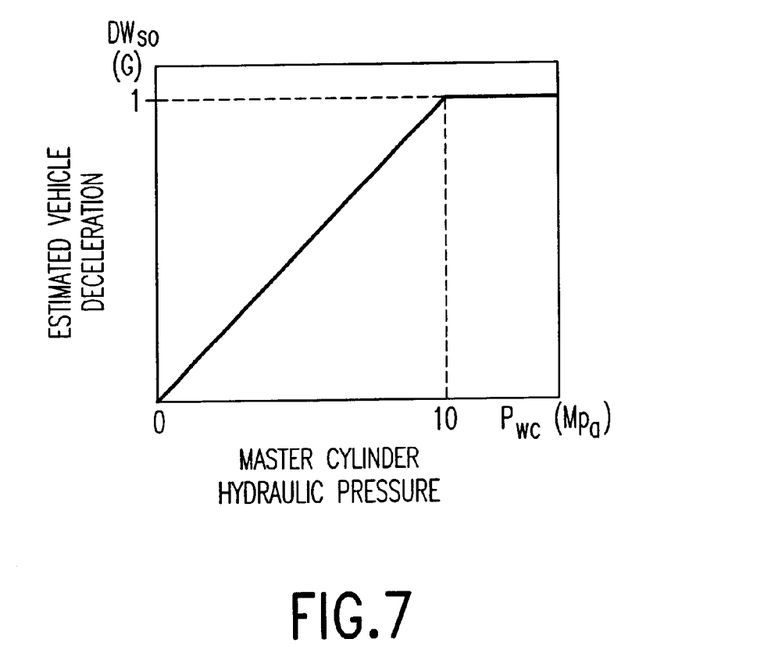
FIG. 7 is a graph illustrating the relationship between the wheel cylinder hydraulic pressure Pwc and the estimated vehicle deceleration DVso used to calculate the wheel cylinder hydraulic pressure Pwc shown in FIG. 6.

The pressure increase output time t of the pulse pressure increase conducted in Step 110 is adjusted following the flowchart shown in FIG. 6. In Step 301, a brake hydraulic pressure Pwc for the respective wheel cylinders 12a–12d (hereinafter called wheel cylinder hydraulic pressure) is calculated based on the estimated vehicle deceleration DVso obtained in Step 115. As shown in FIG. 7, the wheel cylinder hydraulic pressure Pwc is stored as a map in the microcomputer 29 as a function of the estimated vehicle deceleration DVso. In this embodiment, the following relationships exist.

1. With a wheel cylinder hydraulic pressure Pwc equal to zero Mpa (Pwc=0 (Mpa)), the estimated vehicle deceleration DVso is equal to zero (DVso=0).

2. With a wheel cylinder hydraulic pressure Pwc greater than zero Mpa and less than 10 Mpa (0 Mpa<Pwc<10 Mpa), the wheel cylinder hydraulic pressure Pwc is directly proportional to the estimated vehicle deceleration Dvso.

3. With a wheel cylinder hydraulic Pressure Pwc is equal to or greater than 10 Mpa (Pwc≧10(Mpa)), the estimated vehicle deceleration Dvso is equal to 1 (DVso=1), which is constant.

Figure 8:
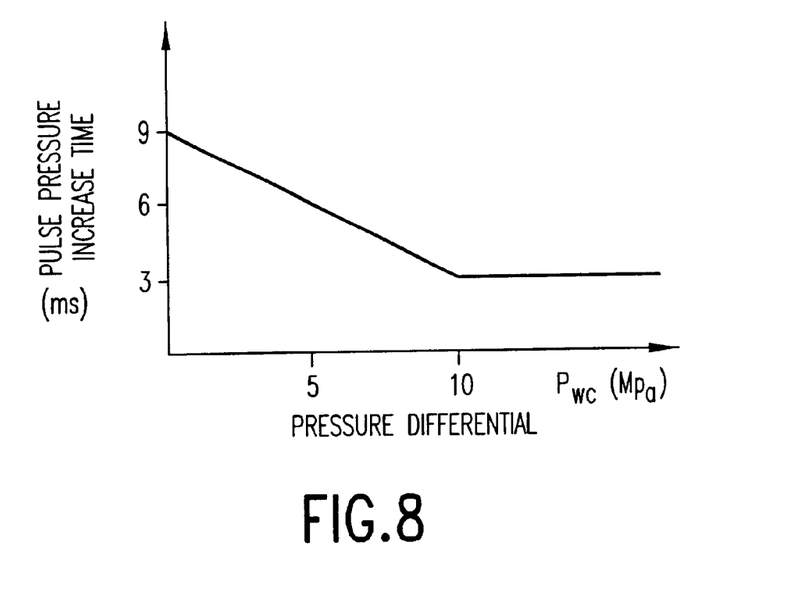
FIG. 8 is a graph showing the relationship between the pressure differential and the pulse pressure increase time.

Next, in Step 302, a determination is made whether a pressure differential ΔP (=Pmc-Pwc) between the master cylinder hydraulic pressure Pmc detected in Step 113 of the last cycle and the wheel cylinder hydraulic pressure Pwc obtained in Step 301 is greater than 10 Mpa. When the pressure differential between the master cylinder hydraulic pressure Pmc and the wheel cylinder hydraulic pressure Pwc is greater than 10 Mpa (Pmc-Pwc>10 Mpa), the pulse pressure increase output time t of the pulse pressure increase is determined as 3 ms at Step 303. When the pressure differential between the master cylinder hydraulic pressure Pmc and the wheel cylinder hydraulic pressure Pwc is equal to or less than 10 Mpa (Pmc-Pwc>10 Mpa is not achieved), the pulse pressure increase output time t of the pulse pressure increase is determined as 9–0.6(Pmc-Pwc) in Step 304. The relationship between the pulse pressure increase output time t of the pulse pressure increase and the pressure differential between the master cylinder hydraulic pressure Pmc and the wheel cylinder hydraulic pressure Pwc (indicated as Pmc-Pwc) is shown in FIG. 8. Accordingly, the pulse pressure increase output time t of the pulse pressure increase is stored as a map in the microcomputer 29 as a function of the pressure differential ΔP (=Pmc-Pwc), In accordance with the present invention, the increase pressure output time t of the pulse pressure increase from the master cylinder 11a to the wheel cylinder of each wheel FR, FL, RR, RL is adjusted based on the pressure differential of the master cylinder hydraulic pressure Pmc and each wheel cylinder hydraulic pressure Pwc (i.e., ΔP=Pmc-Pwc).

Because the pulse pressure increase is conducted according to the pressure increase output time t adjusted on the basis of the pressure differential ΔP (=Pmc-Pwc), the pressure increase amount of the pulse pressure increase for the wheel cylinder hydraulic pressure Pwc of each wheel can be adjusted to be an appropriate value for the condition of the vehicle driving road surface and the stepping or applied force on the brake pedal. As a result, an insufficiency with respect to the pressure increase amount of the wheel cylinder hydraulic pressure in the case of a road surface having a high coefficient of friction μ and an excess in the wheel cylinder hydraulic pressure in the case of a road surface having a low coefficient of friction μ can be inhibited or prevented. This thus provides ABS control performance that is suitable for the condition of the vehicle driving road surface and the stepping force applied to the brake pedal.

According to the present invention, each wheel cylinder hydraulic pressure Pwc is calculated based on the estimated vehicle deceleration DVso obtained from the estimated vehicle speed Vso. Accordingly, it is not necessary to provide detectors for directly detecting the wheel cylinder hydraulic pressure Pwc of each wheel FR, FL, RR, RL, thus reducing the manufacturing cost of the hydraulic brake pressure controller 10.

In addition, the first estimated vehicle speed $Vwo_{(n)}$ and the second estimated vehicle speed $Vso_{(n-1)}-\alpha Dw \cdot t$ are calculated respectively. When the first estimated vehicle speed $Vwo_{(n)}$ is greater than the second estimated vehicle speed $Vso_{(n-1)}-\alpha Dw \cdot t$, the first estimated vehicle speed $Vwo_{(n)}$ is determined to be the estimated vehicle speed Vso. When the first estimated vehicle speed is equal to or less than the second estimated vehicle speed $Vso_{(n-1)}-\alpha Dw \cdot t$, the second estimated vehicle speed $Vso_{(n-1)}-\alpha Dw \cdot t$ is determined to be the estimated vehicle speed Vso. Accordingly, an underestimation of the estimated vehicle speed Vso due to the interference of each wheel in the case of a 4WD vehicle can be substantially avoided or prevented. The underestimation of the slip ratio estimated from the estimated vehicle speed Vso and the wheel speed Vw can also be substantially avoided or prevented. Further, delays with respect to starting the anti-lock braking control due to misjudgment that the vehicle speed Vso and the wheel speed Vw are not different judging from a decline of the estimated vehicle speed Vso accompanying the simultaneous decline of the wheel speed Vw of the four wheels FR, FL, RR, RL can be inhibited or prevented. This thus inhibits or substantially avoids a simultaneous lock-up condition of the four wheels FR, FL, RR, RL upon the occurrence of soft braking while traveling on low $\mu$ road surface.

It is to be understood that the present invention is not limited to the specific details of the embodiment described above. For example, although each wheel cylinder hydraulic pressure Pwc is calculated based on the estimated vehicle deceleration DVso obtained from the estimated vehicle speed Vso, a detector may be provided on the respective wheel cylinders 12a–12d to apply the hydraulic pressure value directly detected from the detector as each wheel cylinder hydraulic pressure Pwc. By using detectors on the respective wheel cylinders, the pressure increase output time t of the pulse pressure increase for each wheel cylinder hydraulic pressure Pwc can be more accurately adjusted.

Also, although the vehicle deceleration for calculating each wheel cylinder hydraulic pressure Pwc is determined using the estimated vehicle deceleration DVso obtained from the estimated vehicle speed Vso, an acceleration sensor (G sensor) may be provided on the vehicle body of the vehicle to apply the value detected from the acceleration sensor as the vehicle deceleration.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A method for pressure increase in a wheel cylinder of a hydraulic brake pressure controller to provide a braking force to a wheel by supplying brake pressure from a hydraulic pressure generator to the wheel cylinder, the method for pressure increase in the hydraulic brake pressure controller being conducted based on a pressure differential between a hydraulic pressure of brake fluid supplied from the hydraulic pressure generator and a brake hydraulic pressure in the wheel cylinder when the brake pressure in the wheel cylinder is increased by the hydraulic pressure controller including calculating an estimated vehicle speed based on a wheel speed of the wheel, and calculating an estimated vehicle deceleration based on the hydraulic pressure of the brake fluid supplied from the hydraulic pressure generator, wherein the estimated vehicle deceleration is calculated to be a first set value when the hydraulic pressure of the brake fluid supplied from the hydraulic pressure generator is zero, the estimated vehicle deceleration being calculated to be directly proportional to the hydraulic pressure of the brake fluid supplied from the hydraulic pressure when the hydraulic pressure of the brake fluid supplied from the hydraulic pressure is greater than zero and less than a first pressure, and the estimated vehicle deceleration being calculated to be a second value different from the first value when the hydraulic pressure of the brake fluid supplied from the hydraulic pressure generator is greater than the first pressure.

2. A method for pressure increase in a wheel cylinder of a hydraulic brake pressure controller to provide a braking force to a wheel by supplying brake pressure from a hydraulic pressure generator to the wheel cylinder, the method for pressure increase in the hydraulic brake pressure controller being conducted based on a pressure differential between a hydraulic pressure of brake fluid supplied from the hydraulic pressure generator and a brake hydraulic pressure in the wheel cylinder when the brake pressure in the wheel cylinder is increased by the hydraulic pressure controller, and including increasing pressure in the wheel cylinder under a pulse pressure increase mode for a pulse pressure increase time, determining the pulse pressure increase time to be a first time period when the pressure differential between the hydraulic pressure of brake fluid supplied from the hydraulic pressure generator and the brake hydraulic pressure in the wheel cylinder is greater than a first predetermined value, and determining the pulse pressure increase time to be a time period different from the first time period when the pressure differential between the hydraulic pressure of brake fluid supplied from the hydraulic pressure generator and the brake hydraulic pressure in the wheel cylinder is less than or equal to the first predetermined value.

3. A method for pressure increase in a wheel cylinder of a hydraulic brake pressure controller to provide a braking force to a vehicle wheel by supplying brake pressure from a hydraulic pressure generator to the wheel cylinder, comprising:
   determining a hydraulic brake pressure in the wheel cylinder;
   determining the brake pressure supplied from the hydraulic pressure generator;
   performing anti-lock braking control by selecting one of a pressure decreasing mode, pulse pressure increasing mode and a pressure maintaining mode;
   determining a pressure differential between the brake pressure supplied from the hydraulic pressure generator and the hydraulic brake pressure in the wheel cylinder;
   increasing the hydraulic brake pressure in the wheel cylinder based on the determined pressure differential when the pulse pressure increasing mode is selected; and
   wherein the hydraulic brake pressure in the wheel cylinder is increased according to a pulse pressure increase time, the pulse pressure increase time being determined based on the pressure differential between the brake pressure supplied from the hydraulic pressure generator and the hydraulic brake pressure in the wheel cylinder.

4. The method according to claim 3, including determining that the pulse pressure increase time is a first time period when the pressure differential between the brake pressure supplied from the hydraulic pressure generator and the brake hydraulic pressure in the wheel cylinder is greater than a first predetermined value, and determining the pulse pressure increase time is a time period different from the first time period when the pressure differential between the brake pressure supplied from the hydraulic pressure generator and the brake hydraulic pressure in the wheel cylinder is less than or equal to the first predetermined value.

5. The method according to claim 3, including calculating an estimated vehicle speed based on a wheel speed of the wheel, and calculating an estimated vehicle deceleration based on the hydraulic pressure of the brake fluid supplied from the hydraulic pressure generator.

6. The method according to claim 5, wherein the estimated vehicle deceleration is calculated to be a first set value when the brake pressure supplied from the hydraulic pressure generator is zero, is calculated to be directly proportional to the brake pressure supplied from the hydraulic pressure generator when the brake pressure supplied from the hydraulic pressure generator is greater than zero and less than a first pressure, and is calculated to be a second value different from the first value when the brake pressure supplied from the hydraulic pressure generator is greater than the first pressure.

7. A hydraulic brake pressure controller comprising:
   a plurality of wheel cylinders each operatively associated with a respective vehicle wheel for providing a braking force to the vehicle wheel;
   a hydraulic pressure generator for supplying brake hydraulic pressure to the wheel cylinders;
   a hydraulic pressure detector for detecting hydraulic pressure supplied by the hydraulic pressure generator;
   a hydraulic pressure controller provided between the hydraulic pressure generator and the wheel cylinders for controlling brake hydraulic pressure in the wheel cylinders;
   a wheel speed detector for detecting a wheel speed of each wheel;
   a wheel speed calculator for calculating the wheel speed using an output signal from the wheel speed detector;
   a wheel acceleration calculator for calculating a wheel acceleration of each wheel using the wheel speed;
   an estimated vehicle deceleration calculator for calculating a vehicle deceleration using an output signal from the hydraulic pressure detector;
   an estimated vehicle speed calculator for calculating an estimated vehicle speed based on the wheel speed and the vehicle deceleration; and
   a braking force controller for controlling a braking force applied to the wheels by actuating the hydraulic pressure controller in accordance with the calculated wheel speed, the calculated wheel acceleration, and the calculated estimated vehicle speed; wherein
      an anti-lock braking control is actuated by the braking force controller to select any one of a pressure decrease mode, a pulse pressure increase mode, and a pressure maintaining mode by judging whether a wheel acceleration is greater than a predetermined threshold value and whether a slip ratio obtained based on the wheel speed and the estimated vehicle speed is greater than a predetermined threshold value by the braking force controller; and wherein
      a pulse pressure increase time of the brake hydraulic pressure used during the pulse pressure increase mode is adjusted based on a pressure differential between the pressure supplied by the hydraulic pressure generator and the brake hydraulic pressure in the wheel cylinders.

8. The hydraulic brake pressure controller according to claim 7, wherein the brake hydraulic pressure in the wheel cylinders is calculated based on the estimated vehicle deceleration obtained from the estimated vehicle speed.

9. The hydraulic brake pressure controller according to claim 8, wherein the selection of the pressure decrease mode, the pulse pressure increase mode and the pressure maintaining mode is performed for each wheel during a program cycle, and wherein the estimated vehicle speed calculator calculates a first estimated vehicle speed based on the wheel speed and determines a second estimated vehicle speed during a current program cycle by subtracting a product of the estimated vehicle deceleration and a time required to complete one program cycle from the estimated vehicle speed calculated in an immediately prior program cycle.

10. The hydraulic brake pressure controller according to claim 8, wherein the estimated vehicle speed calculator determines that the first estimated vehicle speed is the estimated vehicle speed when the first estimated vehicle speed is greater than the second estimated vehicle speed, and wherein the estimated vehicle speed calculator determines that the second estimated vehicle speed is the estimated vehicle speed when the first estimated vehicle speed is equal to or less than the second estimated vehicle speed.

11. The hydraulic brake controller according to claim 10, including a hydraulic pressure detector provided on each wheel cylinder to determine the hydraulic brake pressure in the wheel cylinder.

12. The hydraulic brake pressure controller according to claim 7, wherein the estimated vehicle speed calculator determines that the first estimated vehicle speed is the estimated vehicle speed when the first estimated vehicle speed is greater than the second estimated vehicle speed, and wherein the estimated vehicle speed calculator determines that the second estimated vehicle speed is the estimated vehicle speed when the first estimated vehicle speed is equal to or less than the second estimated vehicle speed.

13. The hydraulic brake controller according to claim 7, including a hydraulic pressure detector provided on each wheel cylinder to determine the hydraulic brake pressure in the wheel cylinder.

14. A hydraulic brake pressure controller comprising:
   a plurality of wheel cylinders each operatively associated with a respective vehicle wheel for providing a braking force to the vehicle wheel;
   a hydraulic pressure generator for supplying brake hydraulic pressure to the wheel cylinders;
   a hydraulic pressure detector for detecting hydraulic pressure supplied by the hydraulic pressure generator;
   a hydraulic pressure controller provided between the hydraulic pressure generator and the wheel cylinders for controlling brake hydraulic pressure in the wheel cylinders;
   a braking force controller for controlling a braking force applied to the wheels to perform anti-lock braking under any one of a pressure decrease mode, a pulse pressure increase mode, and a pressure maintaining mode; and
   means for determining a pulse pressure increase time for carrying out the pulse pressure increase mode based on a pressure differential between the hydraulic pressure supplied by the hydraulic pressure generator and the hydraulic brake pressure in the wheel cylinders.

15. The hydraulic brake controller according to claim 14, including a hydraulic pressure detector provided on each wheel cylinder to determine the hydraulic brake pressure in the wheel cylinder.

16. The hydraulic brake pressure controller according to claim 14, including an estimated vehicle deceleration calculator for calculating a vehicle deceleration, the hydraulic brake pressure in the wheel cylinders being calculated based on the estimated vehicle deceleration.

* * * * *